United States Patent

[11] 3,602,464

[72] Inventor Sho Orii
   2102-1 Oaza Higashi-Hongo, Saitama-ken, Kawaguchi, Japan
[21] Appl. No. 14,541
[22] Filed Feb. 26, 1970
[45] Patented Aug. 31, 1971
[32] Priority June 21, 1969
[33] Japan
[31] 44/58,236

[54] TRANSPORT AND LOCKING DEVICE FOR A MACHINE AND THE LIKE
   7 Claims, 12 Drawing Figs.
[52] U.S. Cl. ................................................. 248/24, 16/32, 280/43.14
[51] Int. Cl. .................................................. B60b 33/06
[50] Field of Search .......................................... 248/24; 16/26, 33, 32, 29; 280/43.14

[56] References Cited
   UNITED STATES PATENTS

| | | | |
|---|---|---|---|
| 1,068,485 | 7/1913 | Davidson | 16/26 |
| 1,076,778 | 10/1913 | Medart | 16/32 |
| 1,133,798 | 3/1915 | Hall | 16/32 |
| 2,002,455 | 5/1935 | Schinerin | 280/43.14 |
| 3,455,526 | 7/1969 | Sho Orii | 248/24 |

Primary Examiner—J. Franklin Foss
Attorney—Waters, Roditi, Schwartz & Nissen

ABSTRACT: A transport stabilizer device for machines and instruments comprises a mounting nut secured to the leg or bottom of a machine or instrument and a frame rotatably mounted on the nut. A vibration damper is vertically movable in the frame by means of an adjustment bolt and an adjusting nut, and a transport wheel is mounted on the frame. The adjustment bolt in the frame is offset horizontally from the center of the frame and the transport wheel in the frame is offset in the opposite direction from the center of the frame, a part of the wheel being located in a notch in the vibration damper near the center of the frame, whereby the vibration damper can descend and contact the floor to support the machine in a stabilized, rest position in which vibration is damped while level adjustment of the machine can be effected. When the vibration damper ascends to leave the floor the transport wheel, in turn, moves down to contact the floor to permit transport of such machine.

TRANSPORT AND LOCKING DEVICE FOR A MACHINE AND THE LIKE

BRIEF SUMMARY OF THE INVENTION

The present invention is directed to a transport stabilizer device which can be installed on various types of machines and instruments preferably on a leg or bottom portion thereof to facilitate its transport or to hold the machine at a stationary location and damp vibration while providing stability for the machine. The stabilizer device is also operable to level said machine or instrument.

In a conventional machine, wheels are separately provided to effect transport of the machine and a vibration-damping block is also separately provided to arrest vibration so as not to transmit machine vibration to the floor and to assure stabilized setting of the machine and also to control the level of the machine. Therefore, substantial space is required for installation of the machine, and also mounting of the machine is troublesome and time consuming.

An object of the present invention is to provide a device which has the fourfold function of facilitating transport of a machine or instrument, of damping vibration thereof, of stabilizing the machine, and effecting its level adjustment. It is also an object of the invention to provide such a device which is compact and of small size.

According to the present invention, there is provided a device adapted for being mounted on an article to selectively support the article for transport or to hold the article in a stable rest position, said device comprising means for attachment to an article which is to be supported on said device, a frame rotatably supported by said means, a wheel supported by said frame, flat support means mounted in said frame for vertical displacement between a retracted position above said wheel and a lowered position below said wheel, said article resting on said wheel via said frame when the flat support means is retracted, and resting on said flat support means when the latter is in lowered position, and actuator means on said frame for raising and lowering the flat support means.

DETAILED DESCRIPTION

Figure 1:
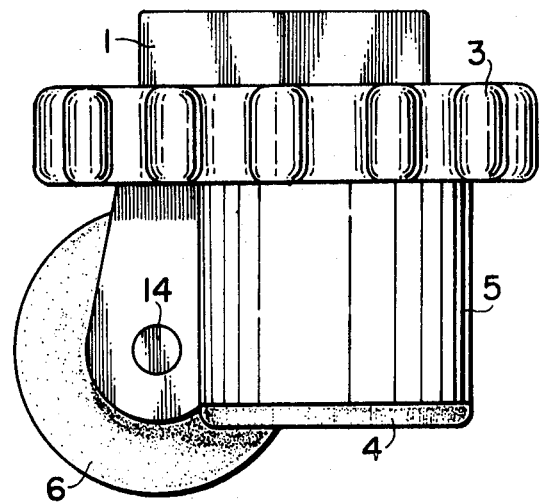
FIG. 1 is a side elevation view of an embodiment of the present invention.
Figure 2:
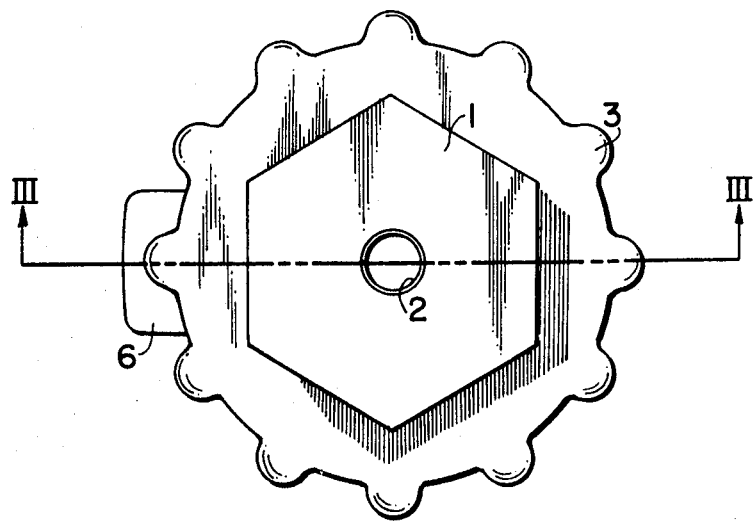
FIG. 2 is a plan view thereof.

Referring to FIGS. 1 and 2 of the drawing, reference numeral 1 denotes a fastening nut which is secured to the leg or bottom portion of a machine or instrument by means of a bolt and the nut 1 has a central threaded hole 2 adapted to engage the bolt therein. A control wheel 3 serves to vertically move a vibration damper means 4 of synthetic rubber, synthetic resin or other similar material. A frame 5 is rotatably mounted from said fastening nut 1, and a transport wheel 6 is mounted on frame 5.

Figure 3:
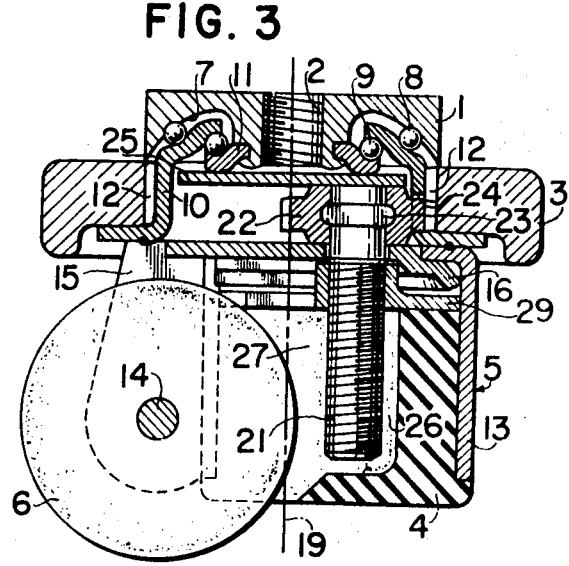
FIG. 3 is a sectional view taken on line III—III of FIG. 2.

The internal structure of the assembly is shown in detail in FIG. 3, and as seen therein the nut 1 has an internal annular groove 7 formed therein receiving the upper end of a thrust cover 10 rotatably supported by steel balls 8 and 9. The thrust cover 10 and the steel balls 8 and 9 are supported by a thrust washer 11 secured to the fastening nut 1. The lower end of the thrust cover 10 terminates in a flange which is welded to the upper end of the frame 5. Around the thrust cover 10 is mounted the annular wheel 3 the underside of which rests on and thereby is supported by, the flange at the lower end of the thrust cover 10. A gear segment 12 is formed around the inner periphery of the wheel 3.

Figure 4A:
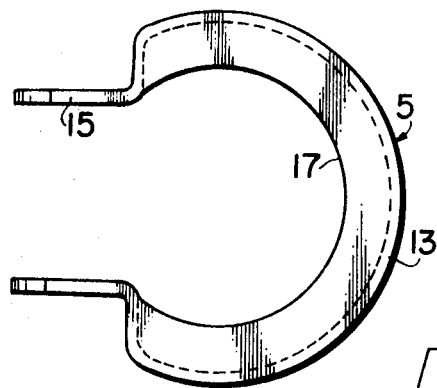
FIGS. 4A and 4B respectively are a plan view and a side view of a frame member of the embodiment.
Figure 4B:
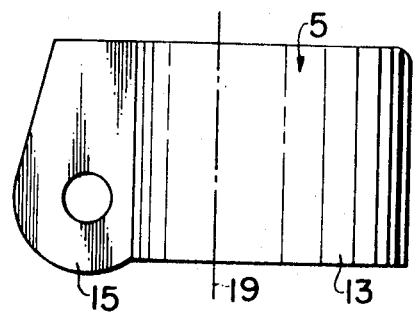
Figure 5A:
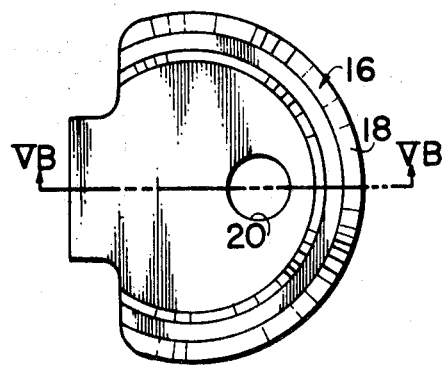
FIGS. 5A and 5B respectively are a plan view of a gear support member and a sectional view taken on the line VB—VB of FIG. 5A.
Figure 5B:

The frame 5 is best seen in FIGS. 4A and 4B and comprises a cylindrical portion 13 adapted to receive the vibration damper means 4, and parallel lug portions 15 adapted to support the transfer wheel 6 via a shaft 14. The portion 13 is provided at its top with an opening 17 in which is engaged a gear stopper 16, as best illustrated in FIGS. 5A and 5B. The gear stopper has a circumferential edge portion 18 which is bent downwardly so that when the gear stopper 16 is fitted in the opening 17 of the frame 5, said bent edge portion 18 will frictionally contact the inner wall of the cylindrical portion 13 of the frame 5 thereby to assure tight abutment of the gear stopper 16 on the frame 5. The gear stopper 16 may be welded to the frame 5. The gear stopper 16 has a hole 20 formed therein at a position offset from the center 19 of the frame 5, and an adjustment bolt 21 passes through hole 20. At the top of the adjustment bolt 21 there is secured a pinion gear 22 through a check or keyway element 23 so as to rotate integrally with said bolt. A portion of the pinion gear 22 protrudes through an aperture 24 in the thrust cover 10 and is in mesh with the gear segment 12 of the wheel 3. Above the pinion gear 22, a gear thrust member 25 is wedged between washer 11 and the top of gear 22.

Figure 7A:
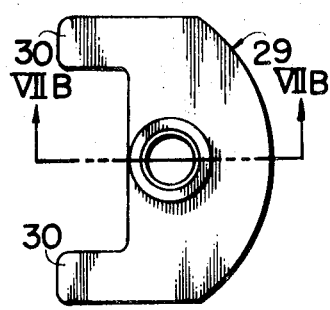
FIGS. 7A and 7B respectively are a plan view of an adjusting nut of the embodiment and a sectional view taken on line VIIB—VIIB of FIG. 7A.
Figure 7B:
Figure 6A:
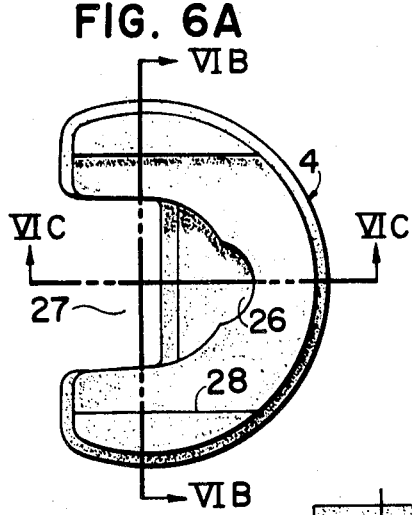
FIGS. 6A, 6B and 6C are respectively a plan view of vibration damper means of the embodiment; and sectional views taken on lines VIB—VIB and VIC—VIC of FIG. 6A.
Figure 6B:
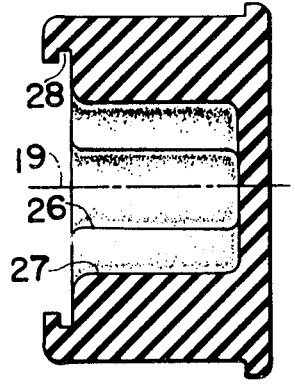
Figure 6C:
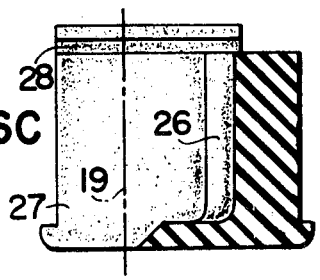

The vibration damper means 4 is constructed as shown in FIGS. 6A, 6B and 6C. At a position eccentric from the center 19 of the frame 5 a notch 26 is formed in which the adjustment bolt 21 is received, and at a position nearer to the frame center 19 another notch 27 is formed in which a part of the transport wheel 6 is positioned, both notches 26 and 27 opening into each other. The vibration damper means 4 is preferably so constructed that it will snugly fit in the inside wall of the cylindrical portion 13 of the frame 5, as shown in FIG. 3. At the upper end of the vibration damper means 4 there are formed engaging slots 28 adapted to receive therein end portions 30 of an adjusting nut 29 having the configuration as shown in FIGS. 7A and 7B. Thereby the vibration damper means 4 is secured to the adjusting nut 29. The adjusting nut 29 is threadably engaged with the adjusting bolt 21.

FIG. 3 shows the condition in which the transport wheel 6 is in contact with the surface of the floor or other installation site. The wheel 6 can be easily turned by pushing the machine or instrument in any desired direction, thereby making it possible to move the machine or instrument in any direction. In this case, the weight of the machine or instrument is transmitted to the floor through the fastening nut 1, thrust cover 10, frame 5 and wheel 6. When it is desired to change the direction of movement it is only necessary to change the direction of push on the machine, and the resisting force of the transfer wheel 6 against the floor causes the thrust cover 10, to rotate between the steel balls 8, 9, so that the direction of the frame 5 and the transport wheel 6 is turned in the desired direction of movement.

When it is desired to install the machine or instrument at a particular stationary position, the frame 5 is securely held against rotation, and the wheel 3 is turned. The turning of the wheel 3 causes corresponding rotation of the adjustment bolt 21, which causes the vibration damper means 4 and the adjusting nut 29 to descend along the adjustment bolt 21 since the damper means 4 and nut 29 are checked against rotation by the engagement of frame 5. If the vibration damper means 4 is lowered so that its bottom face contacts the floor surface, the transport wheel 6 is lifted above the floor surface. In this case, the weight of the machine or instrument is transmitted to the floor through the fastening nut 1, thrust washer 11, thrust member 25, adjustment bolt 21, adjusting nut 29 and vibration damper means 4. Since the frictional resistance between the floor surface and the vibration damper means 4 is great, the machine or instrument is installed in a stable rest position on the floor surface. Additionally, vibration of the machine or instrument is absorbed by the vibration damper means 4 to inhibit propagation of machine vibration to the floor surface.

At lest three of the transfer stabilizer devices according to the present invention are provided for one machine or instrument, and by suitably adjusting the positions of the vibration damper means 4 of the respective transfer stabilizers, it is possible to adjust the level of the machine or instrument.

What is claimed is:

1. A device adapted for being mounted on an article to selectively support the article for transport or to hold the article in a stable rest position; said device comprising means for attachment to an article which is to be supported on said device; a frame rotatably supported by said means, a wheel supported by said frame; flat support means mounted in said frame for vertical displacement between a retracted position above said wheel and a lowered position below said wheel, said article resting on said wheel via said frame when the flat support means is retracted, and resting on said flat support means when the latter is in lowered position; actuator means on said frame for raising and lowering the flat support means; an adjustment bolt rotatably mounted in said frame and coupled to said actuator means; an adjusting nut threadably mounted on said bolt, said flat support means being secured to said nut and being supported in said frame so as to be nonrotatable therein and displaced upwardly and downwardly for opposite directions of rotation of said bolt; said actuator means comprising a rotatable member extending externally of said frame, said rotatable member including a gear portion; a gear secured to said bolt and in mesh with said gear portion of the rotatable member whereby rotation of the latter will cause rotation of said bolt; and said flat support means having a notch in which a portion of said wheel is received.

2. A device as claimed in claim 1 wherein said frame has an axis of rotation relative to the means for attachment to the article, said bolt being offset on one side of said axis of rotation, said wheel being offset on the other side of said axis of rotation.

3. A device as claimed in claim 2 comprising ball bearing means between said frame and said means which attaches to the article.

4. A device as claimed in claim 2 wherein said flat support means is constituted of an elastic, vibration-damping material 5. A device as claimed in claim 4 wherein said rotatable member of the actuator means is a wheel encircling said frame.

6. A device as claimed in claim 5 comprising thrust members supported in said frame and engaging said gear on opposite sides thereof.

7. A device as claimed in claim 5 wherein said flat support means is provided with two opposed slots and said adjusting nut includes arms engaged in said slots such that said nut and said support means are coupled for common rotation.